United States Patent [19]
Antony et al.

[11] Patent Number: 5,697,474
[45] Date of Patent: Dec. 16, 1997

[54] DISC BRAKE WITH A SEAL BETWEEN A BRAKE CALIPER AND AN ACTUATING APPARATUS OF THE DISC BRAKE

[75] Inventors: Paul Antony, Worms; Hellmut Jager, Edingen-Neckarhausen; Wlodzimierz Macke, Heddesheim; Bernd Rupprecht, Edingen-Neckarhausen, all of Germany

[73] Assignee: Perrot Bremsen GmbH, Mannheim, Germany

[21] Appl. No.: 639,082

[22] Filed: Apr. 24, 1996

[30] Foreign Application Priority Data

Apr. 24, 1995 [DE] Germany ............... 195 15 019.8

[51] Int. Cl.$^6$ ..................................... F16D 55/226
[52] U.S. Cl. ..................... 188/72.6; 188/106; 188/72.9
[58] Field of Search .................... 188/72.6, 72.4, 188/72.9, 106 F, 72.7, 72.8, 71.8, 71.9

[56] References Cited

U.S. PATENT DOCUMENTS

| | | | |
|---|---|---|---|
| 5,379,867 | 1/1995 | Macke et al. | 188/72.9 |
| 5,400,875 | 3/1995 | Antony et al. | 188/72.9 |
| 5,433,298 | 7/1995 | Antony et al. | 188/72.7 |
| 5,449,052 | 9/1995 | Macke et al. | 188/72.7 |
| 5,515,949 | 5/1996 | Baumgartner et al. | 188/72.9 |
| 5,547,048 | 8/1996 | Antony | 188/72.9 |
| 5,582,273 | 12/1996 | Baumgartner et al. | 188/72.6 |

FOREIGN PATENT DOCUMENTS

| | | |
|---|---|---|
| 40 32 885 | 4/1992 | Germany . |
| 42 31 560 | 3/1994 | Germany . |
| 43 07 019 | 9/1994 | Germany . |
| 93/22579 | 11/1993 | WIPO . |

*Primary Examiner*—Douglas C. Butler
*Attorney, Agent, or Firm*—Jacobson, Price, Holman & Stern, PLLC

[57] ABSTRACT

A disc brake is described which is actuatable by a fluid pressure actuation apparatus. A brake application shaft (8) with a brake lever (6) extending approximately perpendicularly from the shaft is disposed inside a brake caliper housing (1). The ring-shaped space between the brake lever (6) and the region of the brake caliper housing (1) which surrounds lever (6) is sealed-off by a seal (18).

16 Claims, 11 Drawing Sheets

DISC BRAKE WITH A SEAL BETWEEN A BRAKE CALIPER AND AN ACTUATING APPARATUS OF THE DISC BRAKE

BACKGROUND OF THE INVENTION

The invention relates to a disc brake actuatable by fluid pressure, comprised of:

(a) A brake caliper (with caliper housing), wherein the two arms of the caliper extend over a brake rotor and engage brake heads which bear the brake pads which come to be applied against the brake rotor;

(b) A brake application mechanism disposed on one side of the rotor, which mechanism has an application shaft oriented essentially parallel to the midplane of the rotor, which shaft is braced (directly or indirectly) against the caliper on the side of the shaft which is farther from the rotor, wherein on the side of the shaft which is closer to the rotor the shaft is operatively connected to a brake head, further wherein the shaft bears a cam contour whereby when the shaft is rotated along its longitudinal axis a relative movement of the caliper and the brake head in the axial direction of the brake rotor results, and wherein the brake application mechanism further comprises a brake lever disposed in the interior of the caliper housing, which lever extends radially from the application shaft, wherein the brake is actuated by swinging the brake lever around a swing axis which is parallel to the midplane of the brake rotor transverse to the rotor axis;

(c) An actuating apparatus comprised of a fluid pressure cylinder unit which is removably mounted on the brake caliper, wherein the force from the actuating stroke of the cylinder unit is transmitted through an opening in the caliper housing, to actuate the brake lever; and (d) A coupling member for transmitting forces between the fluid pressure cylinder unit and the brake lever.

Disc brakes of the type described above are known, e.g. from Ger. OSs 42 31 560 A1 and 43 07 019 A1, PCT Pat. App. WO 93/22579, and Ger. OS 40 32 885 A1. In general, the systems described have sealing means for the fluid pressure cylinder unit, the sealing means comprising, e.g., a folding sleeve. The sealing means extend into the mounting region where the mounting surfaces between the caliper housing and the pressure cylinder unit are disposed. When the fluid pressure cylinder unit is mounted on the caliper housing, the conventional sealing system serves to provide a mutual seal between the interior space of the caliper housing, with the brake lever disposed in the interior space and the interior space of the cylinder unit. It is also desired that the sealing system will seal against the exterior, preventing, e.g., moisture, soils, and the like, from the exterior, from penetrating into the interior space of the caliper housing via the abovementioned mounting region.

On occasion it is necessary to remove the fluid pressure cylinder unit from the caliper housing. With the brakes described above, the sealing system present in the actuating cylinder unit (i.e., brake cylinder) will be removed along with the cylinder unit. Consequently, the interior space of the caliper housing, and the brake application mechanism disposed therein, will be exposed via the open caliper housing opening. Soils therefore can enter the interior space and adversely affect the functioning of the brake, or even cause brake failure.

Sometimes with the brakes described above wherein the sealing system is mounted on the fluid pressure cylinder unit, leaks will develop while the fluid pressure cylinder unit is mounted on the caliper housing. The result may be, for example, penetration of moisture into the interior space of the brake caliper housing. This hazard is increased if the interior sealing means in the fluid pressure cylinder unit, which means extend to and into the mounting region where the mounting surfaces between the caliper housing and the pressure cylinder unit are disposed, are defective. Such defects are not detectable from the exterior.

SUMMARY OF THE INVENTION

The underlying object of the present invention is to devise a brake of the type described initially above, wherein the interior space of the caliper housing is reliably protected against soils, moisture, and the like, even when the fluid pressure cylinder unit is removed.

According to the invention, this problem is solved by sealing means which, at least when the brake is in its idle state, provide effective sealing of the ring-shaped space defined between the brake lever and the region of the caliper housing which surrounds the brake lever, wherein the seal means are held fixed to the part of the caliper housing which surrounds the lever, regardless of whether the actuating apparatus is present, and/or:

(i) if the coupling member between the actuating apparatus and the brake level is connected to the fluid pressure cylinder unit (i.e. the actuating apparatus) in such a way that when the unit (the actuating apparatus) is removed, the coupling member is concurrently removed along with the unit, then the seal means are held fixed to the brake lever;

(ii) if the foregoing concurrent removal condition does not apply, the seal means are held fixed to the brake lever and/or to the coupling member.

Stated differently, the seal means, according to the invention, seal-off the interior space of the caliper housing, in which space the brake application mechanism is accommodated. The seal provided is effective regardless of whether the fluid pressure cylinder unit is present, i.e. the inventive seal means are not removed from their effective position on the caliper housing when the cylinder unit is removed. In addition, the inventive seal means provide a seal independently of any other seal means which may already be present in the cylinder unit. For this purpose, the inventive seal means are held in place at least one part of the brake which is not removed when the fluid pressure cylinder unit is removed.

The seal element may be fixed at any suitable locus. A preferred such locus is the circumference of the caliper housing opening. Holding means employed there are easily accessible, allowing easy installation and removal of the seal means.

A holding ring may be applied to the outer edge of the seal element, according to the invention, which ring may be inserted in a corresponding recess in (or at) the circumference of the caliper housing opening. This solution further facilitates assembly and disassembly.

Preferably, the seal element is held in place on the brake lever and/or on the coupling member, which member is operative between the actuating apparatus and the brake lever, at a locus which is disposed close to the caliper housing opening when the brake is in its idle state.

Additionally, or alternatively, the means of holding the seal element in place may comprise a cup-shaped element which rests against a corresponding contour of the brake lever and/or of the coupling member. This enables the seal element to be held securely in place at the inner border of the ring-shaped space without the use of fastening means which, if used, would be fixed to the perimeter of the brake lever and/or of the coupling member. Such an arrangement facilitates assembly and disassembly.

The seal element may be comprised of any material suitable to effect sealing. Preferably, an elastic material is employed, of sufficient flexibility to adjust to the movements which occur in the braking process.

Preferably, the sealing means comprise a "rolling bellows" or a folding sleeve. Such configurations occupy minimal space in the relaxed state.

Preferably, according to the invention, when the application mechanism is in the idle state, the seal element extends externally of the caliper housing. An advantage of this configuration is that no recesses of the seal element will be present in the interior of the caliper housing which can accumulate soils, water, or the like when the pressure cylinder unit is removed; or at least none will be present when the brake is in its idle state.

It is mechanically preferable if the longitudinal axis of the coupling member is essentially parallel to the center axis of the caliper housing opening; and if these two axes are approximately perpendicular to the brake lever over the entire swinging excursion of the lever.

Preferably, the seal element is fixed to the brake caliper housing, and has at least one area which extends into a mounting region in which the brake caliper housing and the fluid pressure cylinder unit are mutually joined together, wherein the area of the seal element serves to seal the mounting region. In this way, the seal element can provide a seal to the mounting region as well as to the interior space of the caliper housing, and thereby can reliably prevent penetration of moisture, soils, and the like through the contact region between the caliper housing and the fluid pressure (pneumatic) cylinder unit.

The area of the seal element which extends into the mounting region may extend in the direction of the center axis of the caliper housing opening, and/or transversely to the direction.

According to a particularly preferred embodiment, the seal element is fixed to the brake caliper housing, and when (and only when) the brake is in its idle state, a compressive sealing surface of the seal element rests against a counter-sealing surface on the brake lever and/or on the coupling member. This embodiment represents a significant simplification, in that actual fixing of the seal element is required only at one locus, namely on the caliper housing.

It is obvious that a "mechanical inverse" to the last-described embodiment is also a possibility, wherein the seal element is fixed to the brake lever and/or to the coupling member, and when (and only when) the brake is in its idle state a compressive sealing surface of the seal element rests against a counter-sealing surface on the caliper housing.

According to a particularly preferred exemplary embodiment of the invention, the area of the elastic seal element, which area extends into the above-described mounting region in which the brake caliper housing and the external actuating apparatus are mutually joined together, and/or the aforesaid compressive sealing surface of the seal element, is/are disposed eccentrically with respect to the center axis of the caliper housing opening. In this way, the sealing system better accommodates the mechanical conditions of the swinging of the brake lever.

When the abovementioned eccentrically configured seal element is employed in order to avoid incorrect mounting of the seal element, preferably means are provided which facilitate installation of the seal element such that the seal element will be correctly mounted as to its angular position around the center axis of the caliper housing opening.

The invention will be described in more detail herein below with reference to exemplary preferred embodiments, with reference to the accompanying drawings, which drawings disclose additional features as well.

DESCRIPTION OF THE PREFERRED EMBODIMENTS

Figure 1:
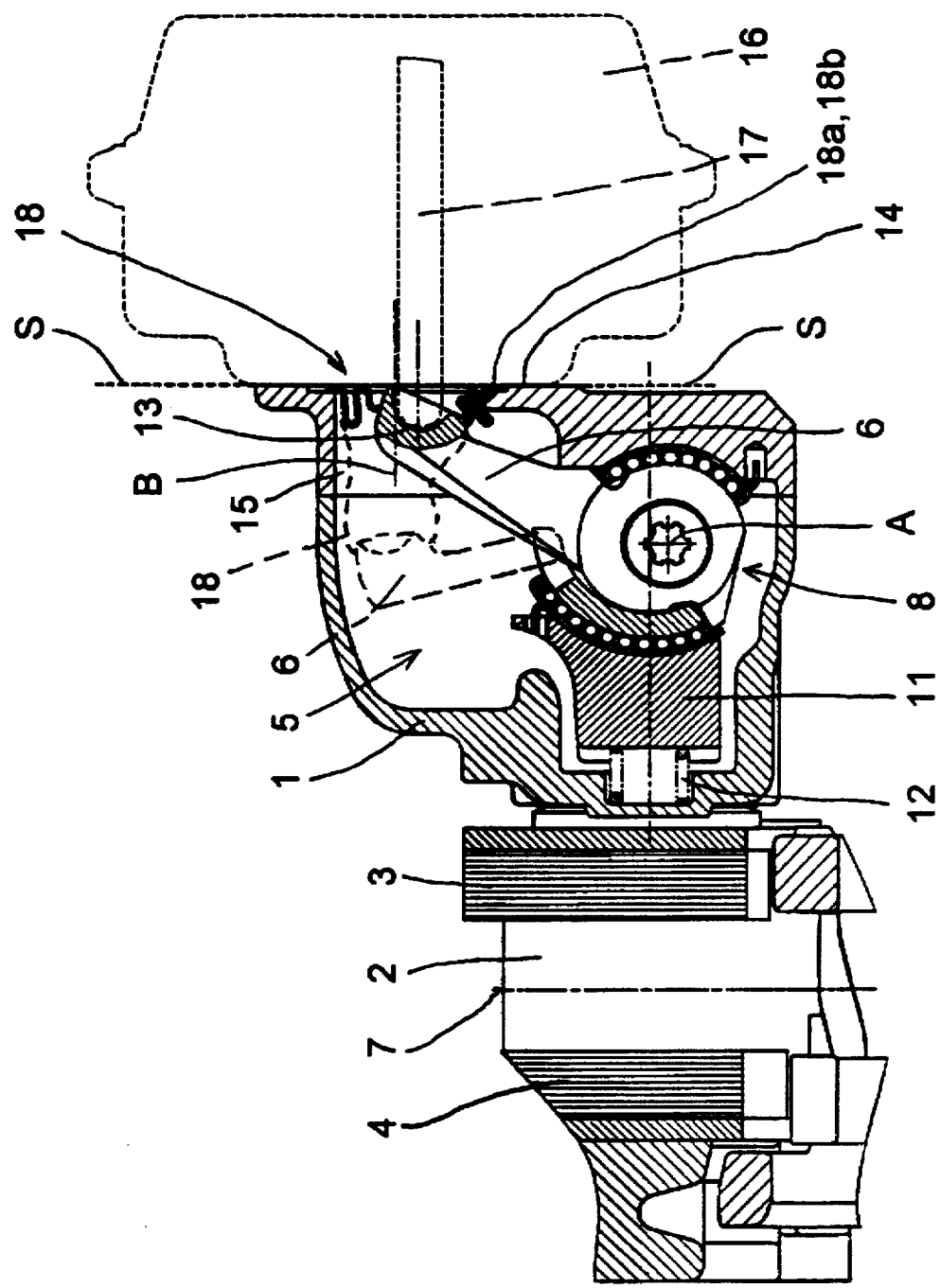
FIG. 1 is a lateral cross sectional view of a brake according to an exemplary embodiment of the invention.

The Figures illustrate embodiments of pneumatically actuated sliding-caliper disc brakes. Such a brake has a caliper 1 the two arms of which extend around a brake rotor 2. Respective brake heads (3, 4) on the two sides of the brake rotor are guided and supported in a brake bracket (not shown) or in the caliper 1. Caliper 1 itself is slidably mounted so as to be translatable in the direction perpendicular to the face of the rotor 2. One side of the caliper 1 bears an application mechanism 5.

The application mechanism 5 has a lever 6 with pivot axis A extending essentially parallel to the midplane 7 of the rotor 2. In the brake shown in FIG. 1, the pivot axis A of lever 6 is fixed. However, the invention is not limited to this embodiment. The invention may be used with brakes in which the pivot axis of the brake lever changes position with increasing application (advancement and force of the brake head). The brake lever 6 is fixed to an application shaft 8 so as to extend radially therefrom. The lever 6 and shaft 8 are disposed inside the housing of the caliper 1.

Figure 2:
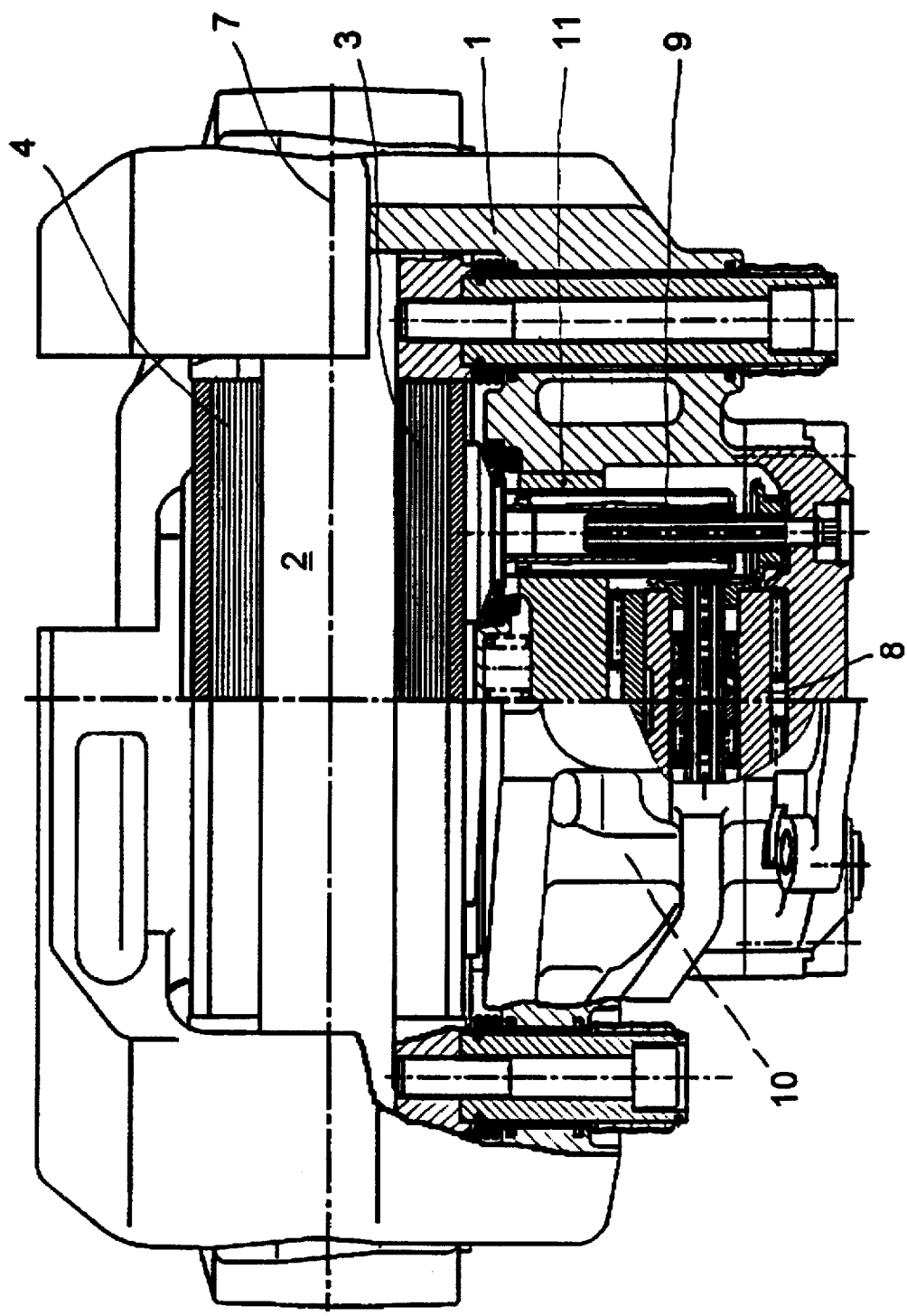
FIG. 2 is a cross sectional view of the brake of FIG. 1, in a section perpendicular to that of FIG. 1.

The application shaft 8 extends along the pivot axis A, and bears a cam contour, arranged such that, when the shaft 8 is rotated along its longitudinal axis a relative movement of the caliper 1 and the brake head 3 in the axial direction of the brake rotor 2 results. In the process, the application force is transmitted from the application shaft 8 to the brake head 3 via thrust shafts (9, 10) (FIG. 2).

The thrust shafts (9, 10) are disposed in the interior of the housing of a thrust head assembly 11. The invention is not limited to this embodiment, but may be used with brakes in which a single thrust shaft is disposed centrally in the thrust head assembly, or with brakes having one or two thrust shafts but lacking the thrust head assembly. In such brakes, the adjustable thrust shafts are accommodated in the caliper housing.

In the region toward the brake disc, the application mechanism 5 has a compression spring 12 which is (directly or indirectly) braced against the caliper housing in order to pre-stressingly urge the application mechanism 5, with lever 6, toward the idle position of the mechanism.

Figure 3:
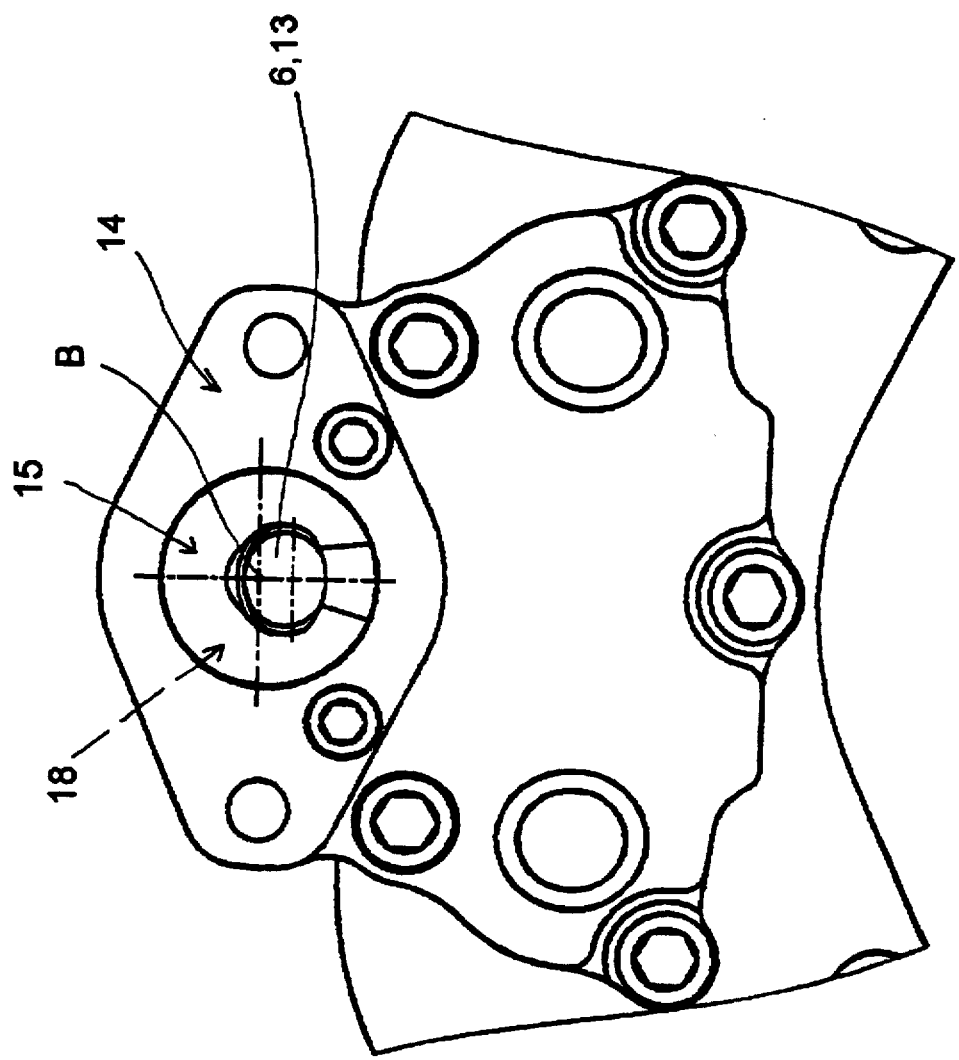
FIG. 3 is a view of the brake of FIG. 1 as viewed from the plane "S" in FIG. 1.
Figure 4B:
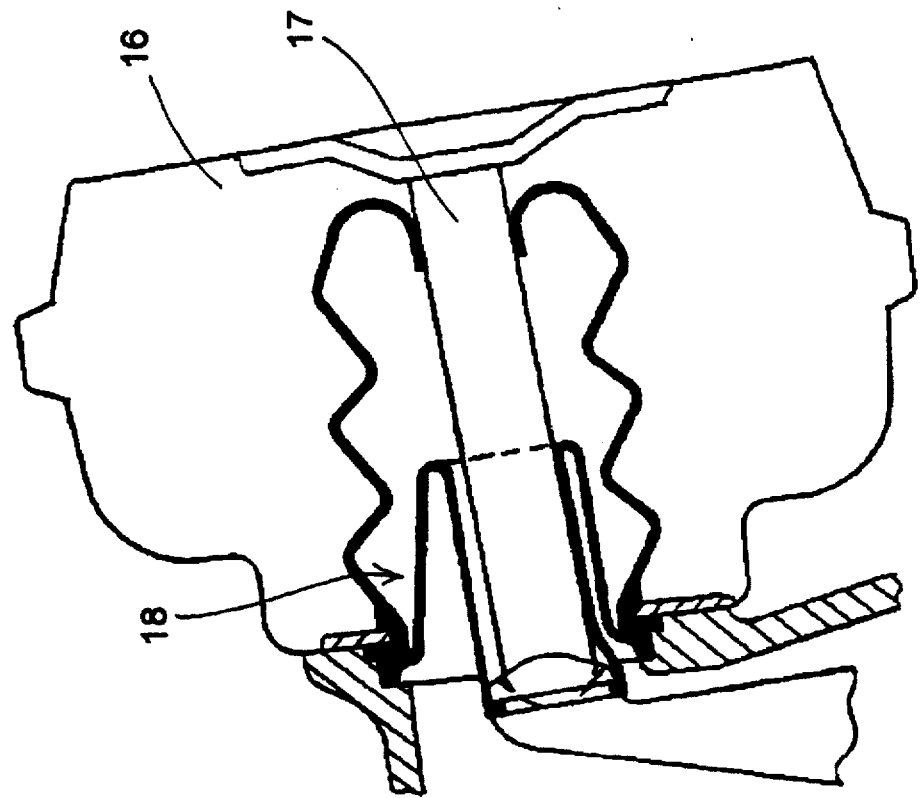
FIGS. 4a and 4b are cross sectional views of details of a second inventive embodiment of a brake.
Figure 4A:
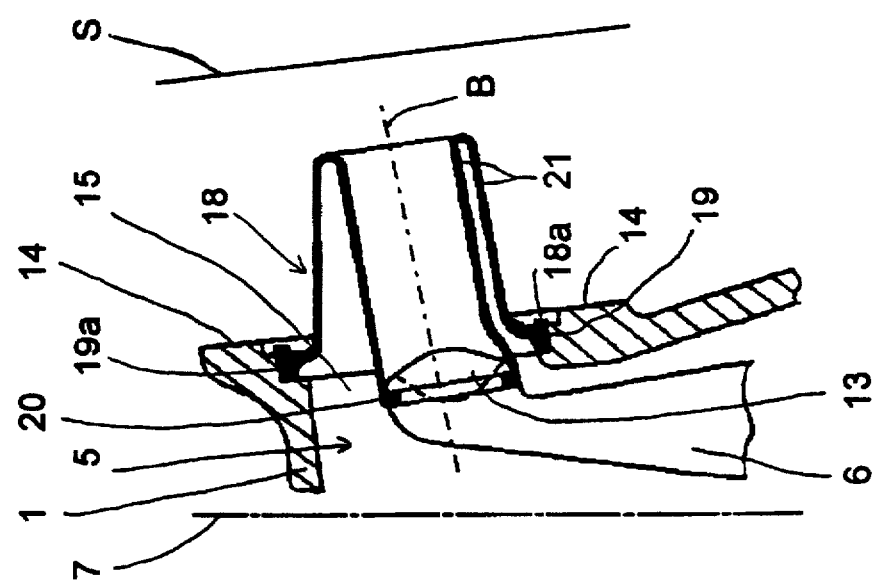
Figure 5B:
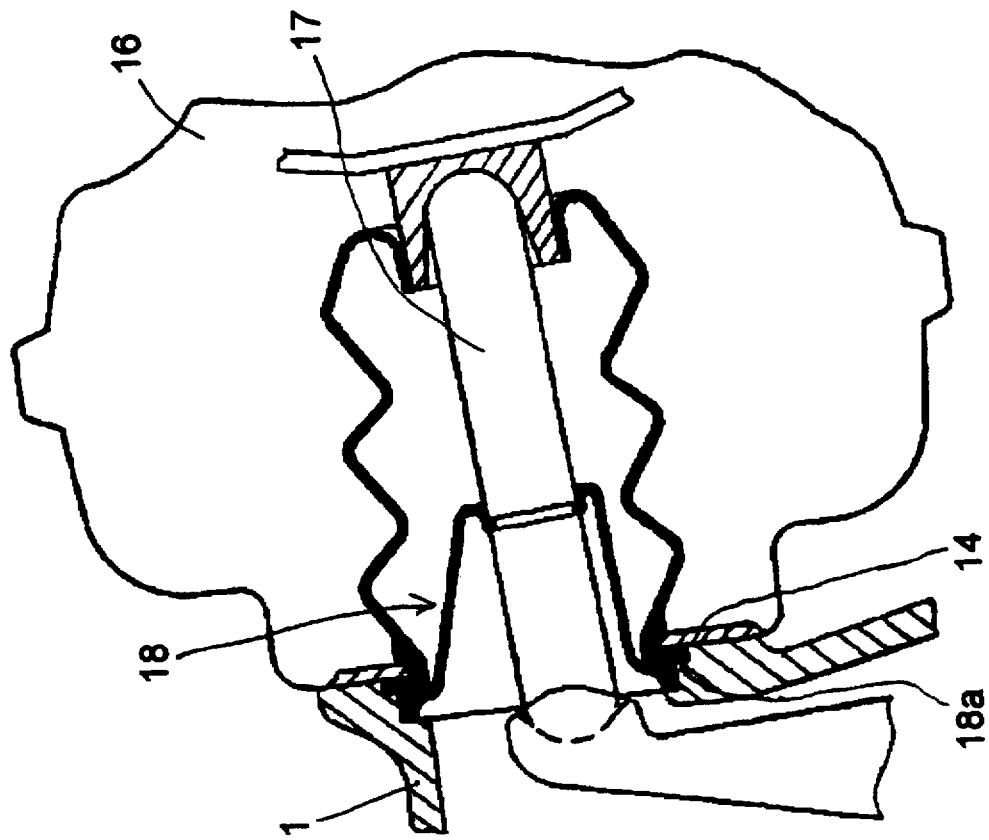
FIGS. 5a and 5b are cross sectional views of details of a third inventive embodiment of a brake.
Figure 5A:
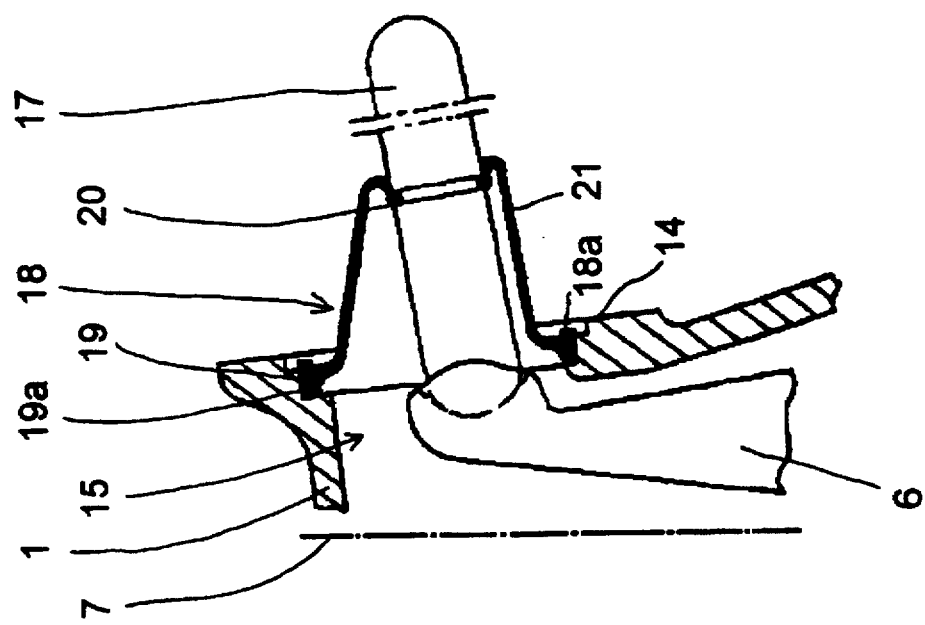
Figure 6B:
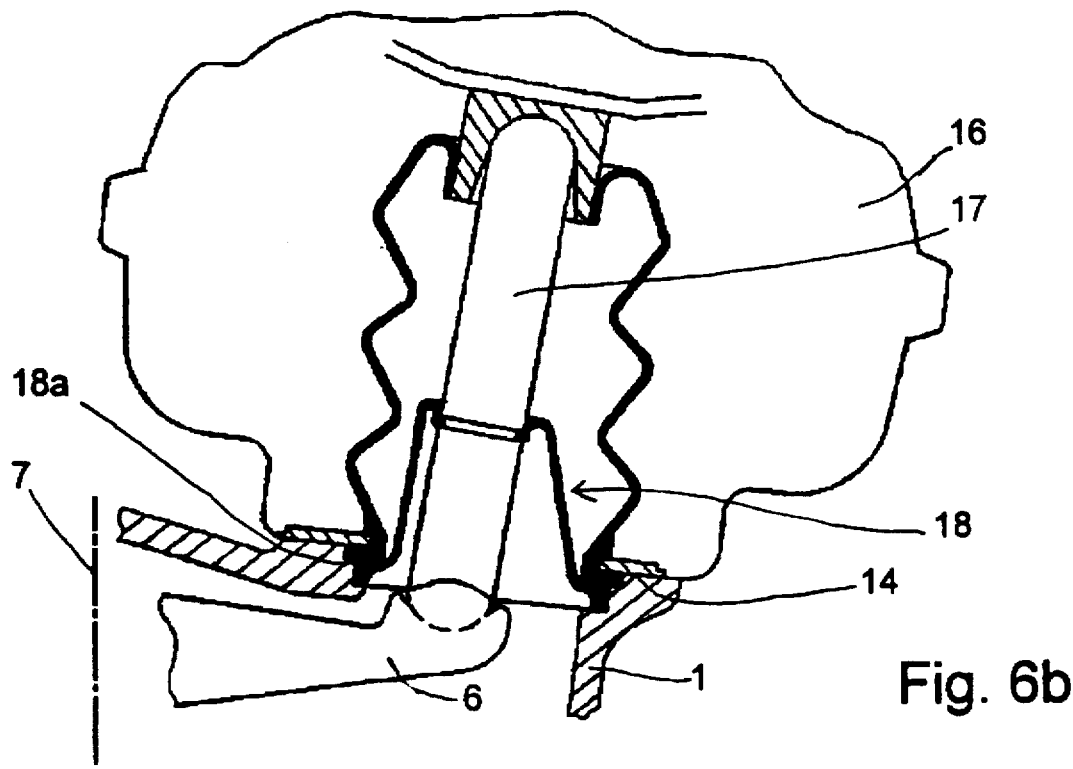
FIGS. 6a and 6b are cross sectional views of details of a fourth inventive embodiment of a brake.
Figure 6A:
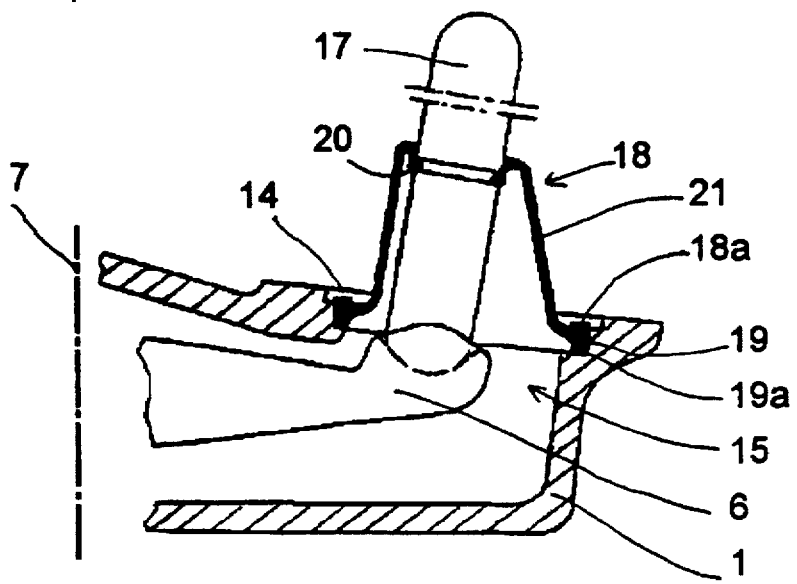
Figure 7:
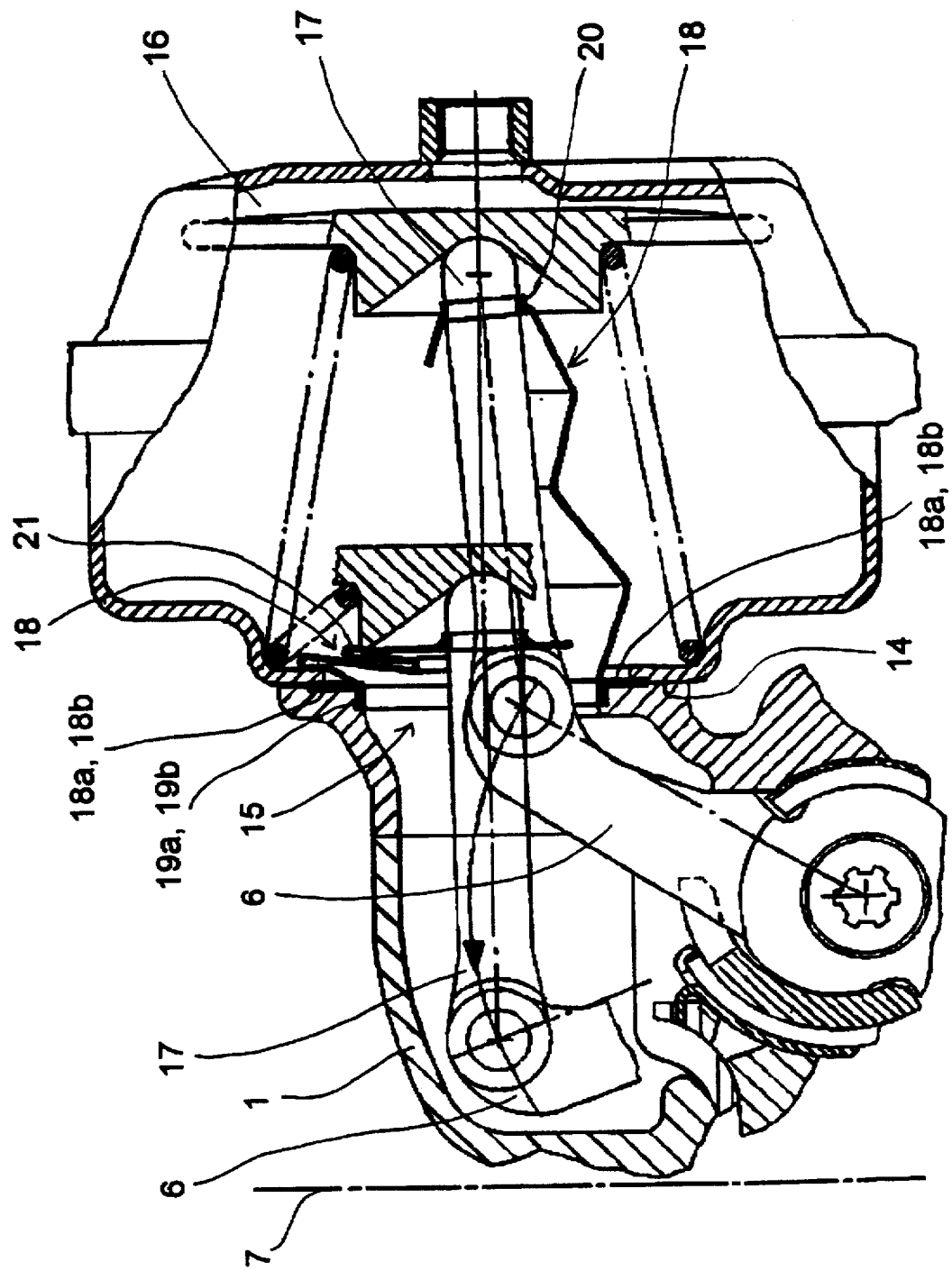
FIG. 7 is a cross sectional lateral view of a fifth inventive embodiment of a brake.

The free end of the lever 6 has a head with a preferably cup-shaped (or spherical) recess 13 which serves as a bearing element for a coupling member for transmitting force from a pneumatic cylinder unit 16 to the brake lever 6. In the exemplary embodiments illustrated, the coupling member is in the form of a piston plunger 17. Various other coupling configurations may be employed for coupling to the lever 6. It may be seen from FIGS. 1 and 3 that the caliper housing 1 has a mounting region 14 with an opening 15 in the housing. The axis B of opening 15 is oriented such that force is transmitted from the pneumatic cylinder unit 16 mounted on region 14 to the free end of the lever 6 with a force transmission vector which continuously approaches the axis B of opening 15, and continuously approaches the perpendicular to the brake lever 6. The mounting region 14 serves for fastening the pneumatic cylinder unit 16 to the caliper housing 1.

Since the force is transmitted between the cylinder apparatus 16 and the application mechanism 5 via the piston plunger 17, the cylinder apparatus 16 may be mounted in an attitude with respect to the brake axis (or the main plane 7 of the rotor 2) which attitude ranges from approximately parallel to approximately perpendicular to, the axis (or plane 7). The mounting may be direct or via an extension piece.

As mentioned above, accordingly to the invention, a seal 18 is provided which seals the ring-shaped space between the lever 6 and the region of the caliper housing 1 which surrounds the lever 6. FIGS. 4a through 11 illustrate different embodiments of the inventive seal, showing different dispositions, fastenings, and other features. In the Figures which have "a" and "b" versions, the "a" versions represents a brake without an incorporated pneumatic cylinder unit, and the "b" version represents a brake with such a cylinder. In the "b" versions, a second seal is provided, in the interior of the pneumatic cylinder enclosure. This seal extends into the region between the caliper housing 1 and the pneumatic cylinder, at the mounting surface between the housing 1 and the pneumatic cylinder.

In FIGS. 4a–11, the caliper housing opening has a ring-shaped recess 19 which is open toward the pneumatic cylinder 16 and serves for fixing the seal element 18. The seal 18 has a generally circular transverse cross section. The outer edge 18a of the seal is fastened in recess 19 and extends axially outward from said recess 19, toward the pneumatic cylinder unit 16, and additionally has at least one additional ring-shaped sealing surface 18b which extends into the mounting region 14 where the mounting surfaces between the caliper housing 1 and the pneumatic cylinder 16 are disposed. To improve the seal quality, at the additional ring-shaped sealing surface 18b may extend radially to a substantial degree (FIGS. 1, 7, 10, 11). The axial sealing surface 18a and/or the radial sealing surface 18b provide(s) additional sealing capability between the mounting surfaces, over and above that provided by the sealing system already present in the pneumatic cylinder 16, which additional sealing capability contributes to brake reliability and reliably excludes entry of moisture, soils, and the like from the exterior through the mounting region between the caliper housing 1 and the pneumatic cylinder 16. The inner edge of the seal element 18 (cf. outer edge mentioned above) has a fixing region 20 which, in the exemplary embodiments illustrated, is fixed to the brake lever 6 or the piston plunger 17, or between abutting surfaces of these two elements.

An elastic middle region 21 is provided between the outer and inner edges of the seal element 18, which region is dimensioned such that it can at least follow the entire excursion of the head of the brake lever 6 and piston plunger 17 generally along axis B, when the brake is actuated. In FIG. 1, the advanced position of the lever 6 is shown in dashed lines. In FIGS. 4a to 6b, the elastic middle region 21 is shown as a "rolling bellows", and in FIG. 7 as a folding sleeve. Other configurations are possible as well, for the middle region 21. The configuration chosen must provide sufficient elasticity to allow the seal to be maintained over the excursion of the lever 6 and plunger 17.

A metal ring 19a is applied to the outer edge 18a of the seal element 18 such that the material of the edge region is compressed into the ring-shaped recess 19 to securely hold the outer edge 18a in place and provide a durable seal. Obviously, alternative holding means may be employed which provide secure fixing and sealing.

Figure 8B:
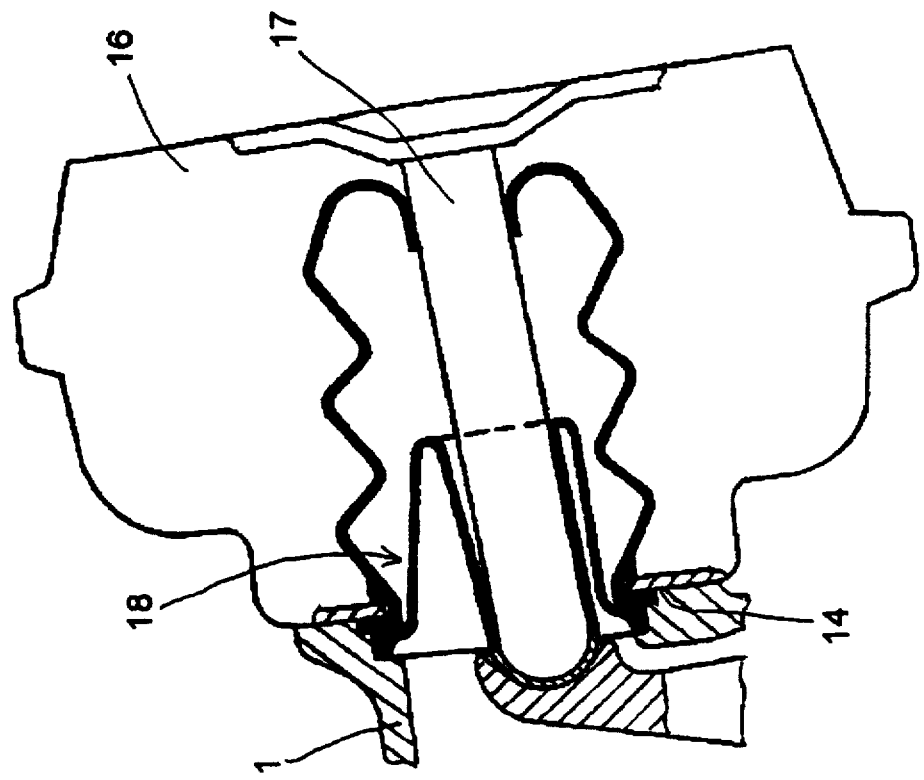
FIGS. 8a and 8b are cross sectional views of details of a sixth inventive embodiment of a brake.
Figure 8A:
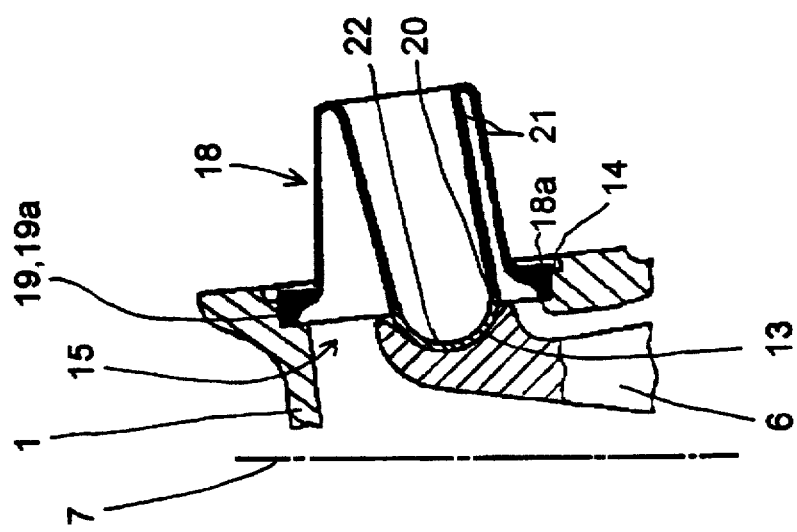
Figure 9B:
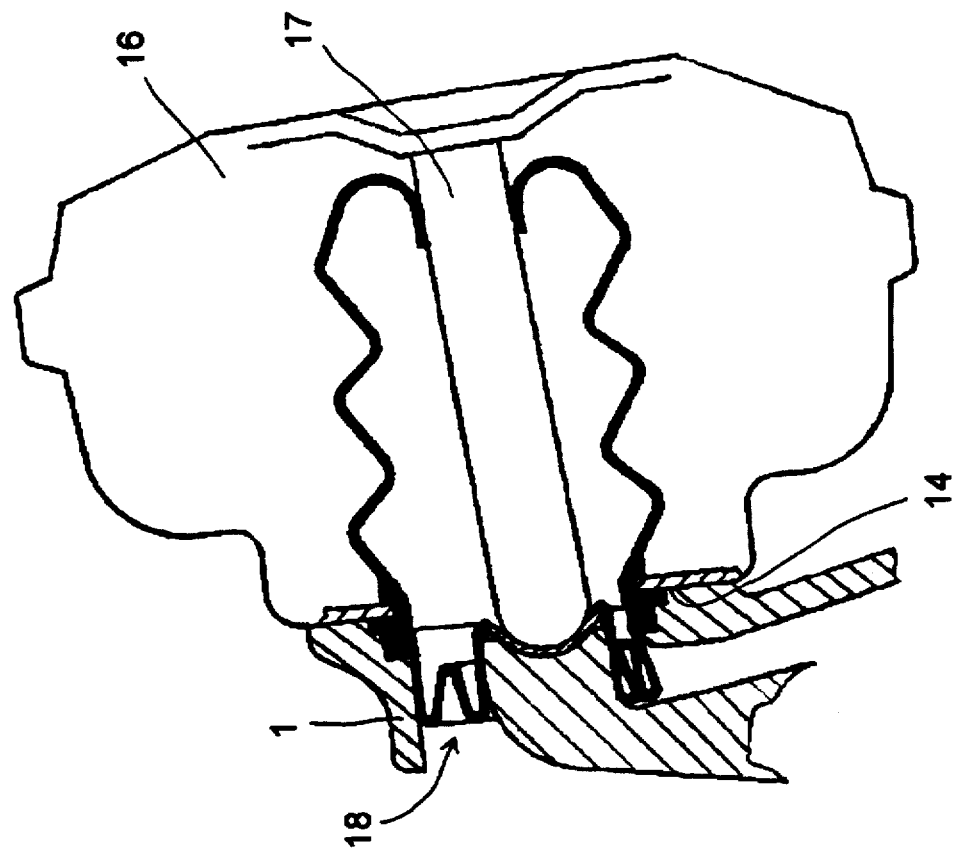
FIGS. 9a and 9b are cross sectional views of details of a seventh inventive embodiment of a brake.
Figure 9A:
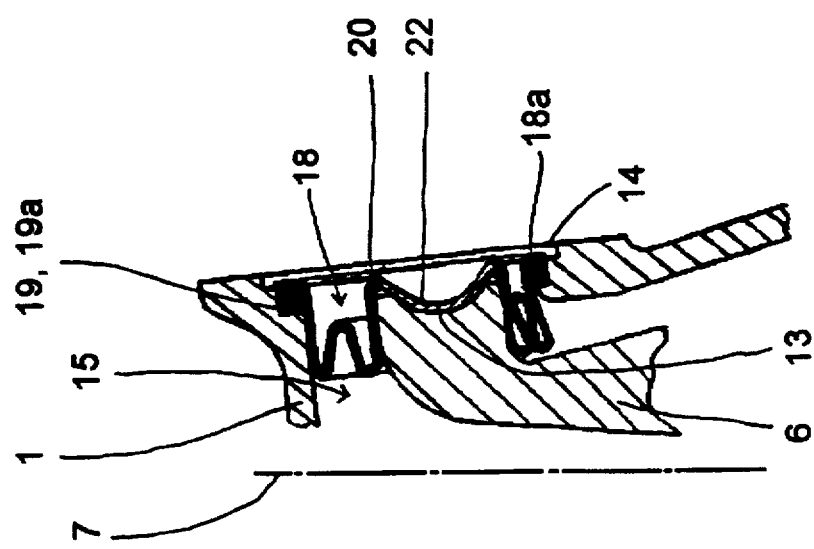

According to FIGS. 8a and 9b, the seal element 18 in the form of a rolling bellows or folding sleeve has a metal cup 22 in its center region which can be inserted and held in the spherical recess 13 (or other suitably shaped contour) in or on the brake lever 6 and/or piston plunger 17.

According to FIGS. 5a to 7, when the application mechanism 5 is in its idle position, the seal element 18 extends outside the caliper housing 1. An advantage of this is that, if the pneumatic cylinder unit 16 is removed, no recesses of element 18 will be present in the interior of the caliper housing which can accumulate soils, water, or the like. This configuration is particularly advantageous if the piston plunger 17 extends along axis B, through the opening 15 of the caliper housing 1 and toward the pneumatic cylinder unit 16, and is coupled to the end of the brake lever 6, such that the inner edge of the seal element 18 can be fixed to the plunger structure at a location (20) which is generally outside the caliper housing. This will avoid any recesses in the seal element 18 which would be vulnerable to accumulation of soils, water, or the like, particularly if, e.g., as in FIGS. 6a and 6b, the pneumatic cylinder unit 16 is mounted on the caliper in an orientation which is generally perpendicular to the brake axis. When one replaces (or partially disassembles) a pneumatic cylinder unit 16 thus mounted, necessitating a period of time in which the caliper housing opening 15 is left exposed to the exterior, the seal 18 prevents penetration of soils, moisture, and the like through the opening 15 in the caliper housing and into the interior of the brake. Without the seal 18, such contamination would be highly likely.

When the system is in the assembled state, the function of the seal element 18 is simple. Seal 18 is fixed at locations near the caliper housing opening 15 and on the brake lever 6 and/or on the piston plunger 17. When the brake is actuated, the force transmission from the pneumatic cylinder unit 16 to the application mechanism 5 proceeds approximately parallel to the axis B. The inner edge of the seal 18 follows the movement of the lever 6 and/or plunger 17, expanding and contracting according to its configuration and position (the configuration of the seal element being, e.g., that of a rolling bellows or folding sleeve).

Figure 10:
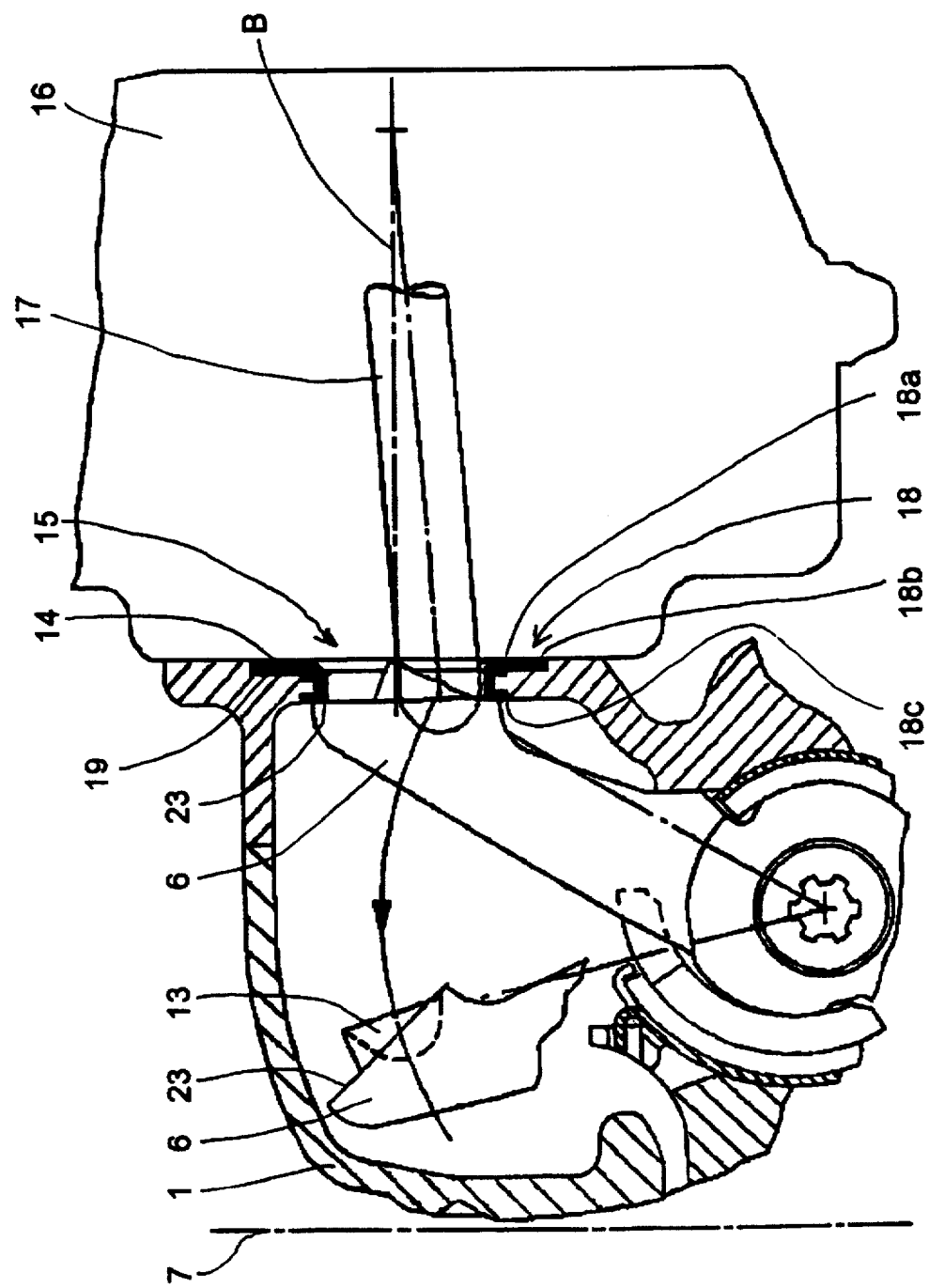
FIG. 10 is a cross sectional lateral view of an eighth inventive embodiment of a brake.
Figure 11:
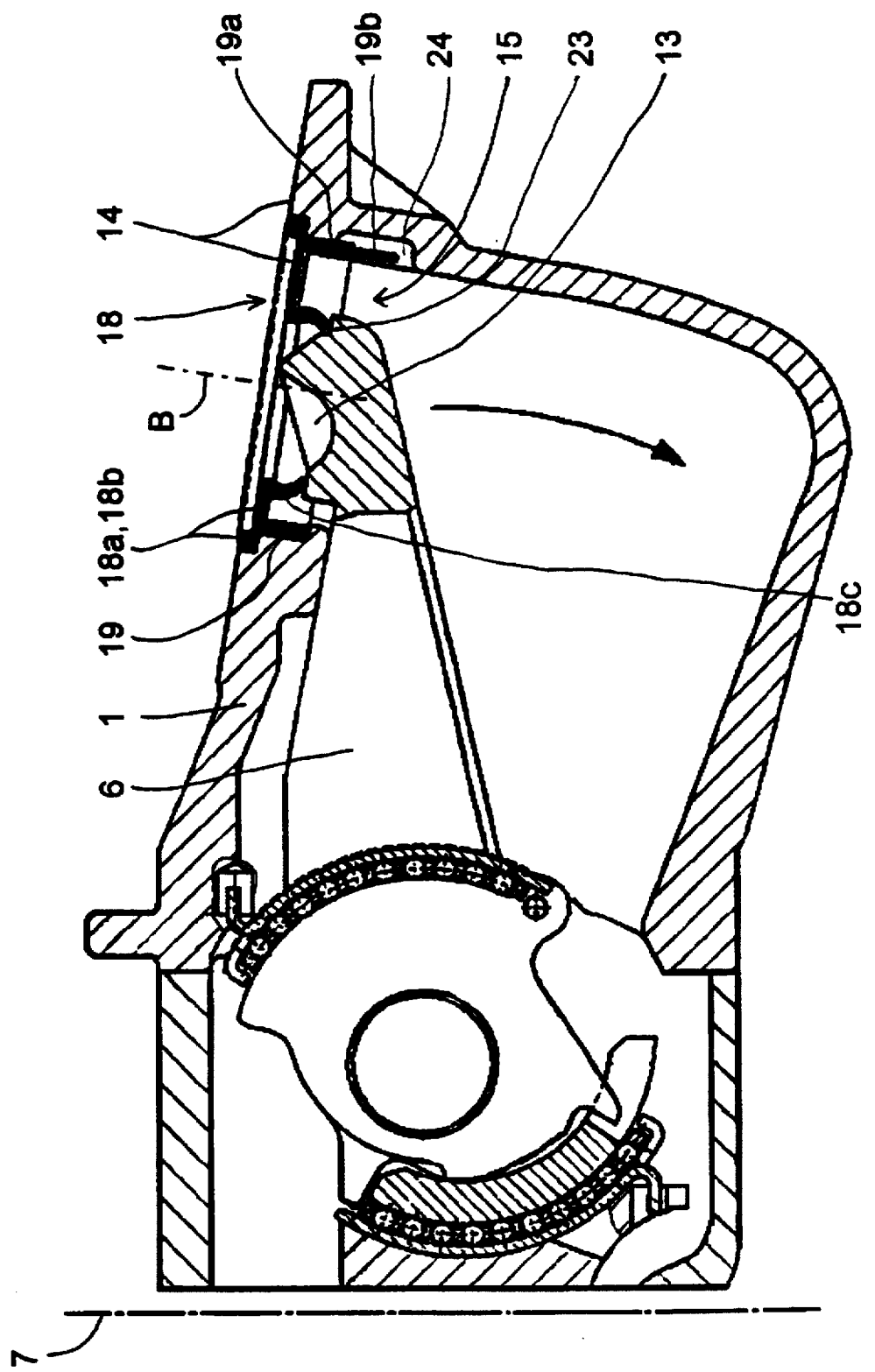
FIG. 11 is a cross sectional lateral view of a ninth inventive embodiment of a brake.

FIGS. 10 and 11 illustrate exemplary embodiments of the invention in which the seal element 18 is fixed only to the caliper housing 1, in the region of the opening 15. The seal is not fixed to the brake lever 6 or the coupling member 17. In FIG. 10 the lever 6 is in its idle position, generally at the right end of its excursion. The position in FIG. 11 is also the idle position. In this rest position (FIGS. 10 and 11), a ring-shaped wiper region or counter-sealing region 23 of lever 6 rests against a ring-shaped compressive sealing surface 18c of seal 18. Counter-sealing region 23 encircles the recess 13 in lever 6. Preferably, the seal element 18 is elastic in the region of its compressive sealing surface 18c, in order to ensure contact over its full surface, and a good seal.

The holding ring 19a serves to hold the seal element 18 in place in the recess 19. A positioning extension 19b on holding ring 19a extends into an axial recess 24 in the caliper housing 1. In this way, the seal element 18 can be installed in only one angular position around axis B of the caliper housing opening 15. This is important because, due to the mechanical conditions of the swinging of lever 6, it is advantageous for the seal element 18 to have a configuration which is eccentric with respect to the center axis B of the caliper housing opening 15 (see FIG. 11).

The wiper region or counter-sealing region 23 may be used by itself or in combinations with other seal configurations described above. For example, it may cooperate with the inner circumference of the other seal configurations described above, providing additional sealing capability.

Finally, in order to provide durable protection, the seal 18 is preferably comprised of material(s) which is/are not susceptible to degradation from external influences.

The inventive features disclosed in the Specification, Claims, and drawings may generally be employed individually or in combination, in their various embodiments, for implementing the invention.

List of Reference Numerals

1 Brake caliper housing (or brake caliper)
2 Brake rotor
3,4 Brake head
5 Brake application mechanism
6 Brake lever
7 Midplane("principal plane") of the brake rotor
8 Application shaft
9,10 Thrust shaft
11 Thrust head assembly
12 Compression spring
13 Recess in brake lever head
14 Mounting region on caliper housing
15 Opening in caliper housing
16 Pneumatic (or fluid pressure) cylinder unit
17 Piston plunger
18 Seal element
18a Axial sealing region
18b Radial sealing region
18c Compressive sealing surface
19 Recess
19a Holding ring for seal element 18
19b Positioning extension on holding ring 19a
20 Fixing locus
21 Middle region of seal element 18
22 Metal cup element
23 Wiper region or counter-sealing region of lever 6
24 Axial recess in caliper housing 1
A Swing axis of brake lever 6
B Center axis of opening 15 in caliper housing 1
S Interface between brake application mechanism 5 and actuating device 17

We claim:

1. A disc brake actuatable by fluid pressure, comprising:
    (a) a brake caliper having a caliper housing and two arms which are adapted to extend over a brake rotor and engage brake heads which come to be applied against the brake rotor;
    (b) a brake application mechanism disposed adjacent one side of the brake rotor, said brake application mechanism having an application shaft oriented substantially parallel to the brake rotor, said application shaft being arranged so as to bear against the brake caliper via a first side of said application shaft which is directed generally away from the brake rotor, wherein another side of said application shaft which is closer to the brake rotor than said first side is operatively connected to a brake head, said application shaft further comprising a cam contour arranged so that, when said application shaft is rotated about a longitudinal axis thereof, a relative movement of the brake caliper and the brake head is achieved in an axial direction with respect to the brake rotor, said brake application mechanism further comprising a brake lever disposed in the caliper housing, which lever extends radially from the brake application shaft so that the brake is actuatable by swinging the brake lever around a swing axis which is parallel to the brake rotor;
    (c) an actuating apparatus including a fluid pressure cylinder unit which is removably mounted on the brake caliper such that a force from an actuating stroke of said fluid pressure cylinder unit is transmitted through an opening in the caliper housing, to actuate the brake lever; and
    (d) a coupling member for transmitting forces between the fluid pressure cylinder unit and the brake lever, and further comprising:
       a seal element for providing a seal, which is effective at least when the brake is in an idle state, to seal a generally ring-shaped gap formed between the brake lever and a portion of the caliper housing which surrounds the opening in the caliper housing, wherein said seal element is arranged so as to satisfy the following conditions:
          said seal element is held fixed against said portion of the caliper housing, regardless of whether the actuating apparatus is mounted to the caliper housing, and:
             (I) if the coupling member is connected to the fluid pressure cylinder unit such that when said fluid pressure cylinder unit is removed from said caliper housing the coupling member is removed along with said fluid pressure cylinder unit, then said seal element is held fixed against the brake lever; and
             (ii) if said fluid pressure cylinder is removable from the caliper housing without removing said coupling member from said caliper housing, said seal element is held fixed against at least one of the brake lever and the coupling member.

2. The disc brake according to claim 1, wherein the seal element is held in place along a circumference of the opening in the caliper housing.

3. The disc brake according to claim 2, further comprising a holding ring applied at an outer edge of the seal element, said ring being insertable into a matching recess on the circumference of the opening in the caliper housing.

4. The disc brake according to claim 1 wherein the seal element is held in place on at least one of the brake lever and the coupling member, at a locus which is disposed close to the opening in the caliper housing when the brake is in said idle state.

5. The disc brake according to claim 1; and further comprising a cup-shaped element which rests against a corresponding contour of at least one of the brake lever and of the coupling member and is arranged so as to hold the seal element in place.

6. The disc brake according to claim 1; wherein the seal element comprises elastic material.

7. The disc brake according to claim 1; wherein the seal element comprises a rolling bellows or a folding sleeve.

8. The disc brake according to claim 1; wherein the seal element is arranged so as to extend out from the caliper housing when the brake is in the idle state.

9. The disc brake according to claim 1; wherein a longitudinal axis of the coupling member is essentially parallel to a center axis of the opening in the caliper housing and substantially perpendicular to the brake lever.

10. The disc brake according to claim 1; wherein the seal element extends substantially parallel to a center axis of the opening in the caliper housing.

11. The disc brake according to claim 1; wherein the seal element is fixed to the brake caliper and has at least one area which extends into a mounting region at which the brake caliper and the fluid pressure cylinder unit are mutually joined together, to seal said mounting region.

12. The disc brake according to claim 11, wherein the area of the seal element which extends into the mounting region extends parallel to a center axis of the opening in the caliper housing.

13. The disc brake according to claim 11; wherein at least one of:

the area which extends into the mounting region, and a compressive sealing surface of the seal element, are disposed eccentrically with respect to a center axis of the opening in the caliper housing.

14. The disc brake according to claim 13, further comprising means for facilitating installation of the seal element such that said seal element is oriented in a correct angular position around the center axis of the opening in the caliper housing.

15. The disc brake according to claim 1; wherein the seal element is fixed to the brake caliper such that, when the brake is in the idle state, a compressive sealing surface of said seal element rests against a counter-sealing region on at least one of the brake lever and the coupling member.

16. The disc brake according to claim 1; wherein the seal element comprises a folding sleeve.

* * * * *